US011518531B2

(12) United States Patent
Puech et al.

(10) Patent No.: US 11,518,531 B2
(45) Date of Patent: Dec. 6, 2022

(54) AIRCRAFT ENGINE ATTACHMENT COMPRISING AT LEAST ONE SYSTEM FOR IMMOBILIZING A SHEAR PIN IN TRANSLATION COMPRISING A STOP PLATE, METHOD FOR MOUNTING SAID ENGINE ATTACHMENT AND AIRCRAFT COMPRISING SAID ENGINE ATTACHMENT

(71) Applicant: Airbus Operations SAS, Toulouse (FR)

(72) Inventors: Jacky Puech, Colomiers (FR); Thomas Deforet, Toulouse (FR); Julien Cayssials, Gagnac sur Garonne (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 258 days.

(21) Appl. No.: 16/733,783

(22) Filed: Jan. 3, 2020

(65) Prior Publication Data
US 2020/0216185 A1 Jul. 9, 2020

(30) Foreign Application Priority Data

Jan. 9, 2019 (FR) ...................................... 1900203

(51) Int. Cl.
*B64D 27/26* (2006.01)
*B64F 5/10* (2017.01)

(52) U.S. Cl.
CPC ............... *B64D 27/26* (2013.01); *B64F 5/10* (2017.01); *B64D 2027/268* (2013.01)

(58) Field of Classification Search
CPC ...... B64F 5/10; B64D 2027/266; B64D 27/26
See application file for complete search history.

(56) References Cited

U.S. PATENT DOCUMENTS

| 4,805,851 A * | 2/1989 | Herbst | F16F 1/371 244/54 |
| 4,943,013 A * | 7/1990 | Kapala | F16B 39/10 244/54 |
| 5,649,417 A * | 7/1997 | Hey | B64D 27/26 60/797 |
| 6,330,995 B1 * | 12/2001 | Mangeiga | B64D 27/26 244/54 |
| 7,681,854 B2 * | 3/2010 | Machado | B64D 27/26 411/315 |

(Continued)

FOREIGN PATENT DOCUMENTS

FR 2891254 A1 3/2007

OTHER PUBLICATIONS

French Search Report; priority document.

*Primary Examiner* — Jacob J Cigna
*Assistant Examiner* — Michael W Hotchkiss
(74) *Attorney, Agent, or Firm* — Greer, Burns & Crain, Ltd.

(57) ABSTRACT

An aircraft engine attachment connecting an attachment body and a primary structure of an aircraft pylon, the engine attachment comprising a shear pin immobilized in translation by a first immobilization system that comprises a shoulder and a removable stop that are integral with the primary structure, between which a flange of the shear pin is immobilized, and a second immobilization system that comprises a stop plate, connected by at least one removable link to the primary structure, which closes the first hole, at least in part.

9 Claims, 7 Drawing Sheets

(56) References Cited

U.S. PATENT DOCUMENTS

| | | | | |
|---|---|---|---|---|
| 7,963,479 B2* | 6/2011 | Cazals | ................... | B64D 27/26 |
| | | | | 244/54 |
| 8,038,092 B2* | 10/2011 | Diochon | ................ | B64D 27/26 |
| | | | | 244/54 |
| 8,083,177 B2* | 12/2011 | Renon | ................... | B64D 27/26 |
| | | | | 244/54 |
| 8,087,608 B2* | 1/2012 | Combes | ................ | B64D 27/26 |
| | | | | 244/54 |
| 9,399,520 B2* | 7/2016 | Cassagne | ............. | F16C 11/045 |
| 10,577,114 B2* | 3/2020 | Geliot | ..................... | F16B 39/20 |
| 10,577,976 B2* | 3/2020 | Izquierdo | ............. | F01D 25/243 |
| 10,626,913 B2* | 4/2020 | Florent | ................ | F16C 11/045 |
| 10,941,675 B2* | 3/2021 | Silva | ..................... | F16B 39/10 |
| 2008/0272230 A1 | 11/2008 | Diochon et al. | | |

* cited by examiner

AIRCRAFT ENGINE ATTACHMENT COMPRISING AT LEAST ONE SYSTEM FOR IMMOBILIZING A SHEAR PIN IN TRANSLATION COMPRISING A STOP PLATE, METHOD FOR MOUNTING SAID ENGINE ATTACHMENT AND AIRCRAFT COMPRISING SAID ENGINE ATTACHMENT

CROSS-REFERENCES TO RELATED APPLICATIONS

This application claims the benefit of the French patent application No. 1900203 filed on Jan. 9, 2019, the entire disclosures of which are incorporated herein by way of reference.

FIELD OF THE INVENTION

The present application relates to an aircraft engine attachment comprising at least one system for immobilizing a shear pin in translation comprising a stop plate, to a system for mounting the engine attachment and also to an aircraft comprising the engine attachment.

BACKGROUND OF THE INVENTION

According to one configuration, which may be seen in FIGS. 1 and 2, an aircraft 10 comprises a plurality of engine units 12 that are positioned under the wing 14 of the aircraft 10.

An engine unit 12 comprises an engine 16, a nacelle (not shown in FIG. 2) positioned around the engine 16 and a pylon 18 that forms the link between the engine 16 and the rest of the aircraft 10, in particular the wing 14.

The pylon 18 comprises a primary structure 20 that is connected to the engine 16 via a front engine attachment 22, a rear engine attachment 24 and a pair of thrust rods 26 that transmit thrust forces.

According to one embodiment, which can be seen in FIG. 3, the front engine attachment 22 comprises an attachment body 28, connected to the pylon 18, that has two clevises 30 arranged on either side of the pylon 18, and also two connecting rods 32 that each connect one of the clevises 30 of the attachment body 28 to a clevis 34 integral with the engine 16. Each connecting rod 32 is connected to one of the clevises 30 of the attachment body 28 via a first articulation pin 36 and to one of the clevises 34 of the engine 16 via a second articulation pin 38.

According to one embodiment, illustrated in document FR2891245, the primary structure 20 has, at the front, two fixing lugs 40 that extend on either side of the primary structure 20 and which offer a contact face, against which is placed a contact face of the attachment body 28. The front engine attachment 22 comprises a link between the primary structure 20 and the attachment body 28 comprising, for each fixing lug 40, a plurality of bolts 42 traversing the fixing lug 40 and the attachment body 28 and also at least one shear pin 44 that is housed straddling a first hole formed in the fixing lug 40 and a second hole formed in the attachment body 28. According to this document, upon mounting, the shear pins are inserted from each fixing lug 40.

During operation, each shear pin 44 has to be immobilized in translation in the first and second holes.

According to one embodiment, each shear pin 44 comprises, at a first end, a shoulder that bears against one of the fixing lugs 40. To prevent the exit of the shear pin 44, a removable stop is placed at the second end of the shear pin 44. This embodiment requires the presence of a first recess on the side of the fixing lug 40, in line with the first hole, to allow the insertion of the shear pin 44, and a second recess on the side of the attachment body 28, in line with the second hole, to allow the placing of the removable stop. In point of fact, in certain cases, for example in the case of ultrahigh bypass ratio (UHBR) engines, access to the front of the attachment body 28 is impossible.

The present invention aims to remedy all or some of the prior-art drawbacks.

SUMMARY OF THE INVENTION

To that end, a subject of the invention is an aircraft engine attachment comprising an attachment body connected to a primary structure of an aircraft pylon via an attachment body link comprising link elements and at least one shear pin that comprises a cylindrical body and a flange having a diameter greater than that of the cylindrical body, the attachment body link comprising, for each shear pin, a first hole in the primary structure and a second hole in the attachment body that are configured such as to accommodate the shear pin, the first hole comprising a shoulder against which the flange bears during operation in such a manner that the cylindrical body is positioned to straddle the first and second holes.

According to the invention, the attachment body link comprises:

a first immobilization system that comprises, in addition to the shoulder, a removable stop, integral with the primary structure, configured such as to immobilize the flange between the shoulder and the removable stop, and
 a second immobilization system that comprises a stop plate, connected by at least one removable link to the primary structure, which closes the first hole at least in part.

Thus, it is possible to mount each shear pin and its immobilization systems solely from the primary structure. Thus, the space between the attachment body and the aircraft engine may be very small at the front of the attachment body.

According to another feature, the stop plate comprises an orifice that has a diameter smaller than the diameter of the flange, positioned in line with the first hole when the stop plate is connected to the primary structure.

According to another feature, for each stop plate, the primary structure comprises an extension traversed by each removable link.

According to another feature, the removable link comprises two fixing elements, each being accommodated in passage holes of the stop plate and of the extension.

According to another feature, the stop plate comprises a recess in addition to the orifice.

According to another feature, the attachment body link comprises at least one anti-rotation system for at least one of the link elements, each anti-rotation system comprising an anti-rotation plate that has a through-orifice with a section that complements a section of a head of the link element such that the stop plate and the head are immobilized in rotation relative to one another, and also a removable link for connecting the anti-rotation plate to the primary structure.

According to another feature, each anti-rotation plate is connected to the stop plate.

According to another feature, for each anti-rotation plate, the stop plate comprises an extension that has a passage orifice for a fixing element connecting the anti-rotation plate and the stop plate.

A further subject of the invention is a method for mounting an engine attachment according to one of the preceding features, comprising the steps:
connecting the attachment body to the aircraft engine,
vertically moving the aircraft engine such as to position first and second contact faces of the primary structure of the aircraft pylon and of the attachment body opposite one another,
placing the link elements,
inserting each shear pin into the first and second holes until the flange is in contact with the shoulder,
placing the removable stop, and
positioning a stop plate and connecting it to the primary structure such as to close the hole at least in part.

A further subject of the invention is an aircraft comprising an engine attachment according to one of the preceding features.

BRIEF DESCRIPTION OF THE DRAWINGS

Other features and advantages will become apparent from the following description of the invention, which is given solely by way of example with reference to the appended figures, in which.

DETAILED DESCRIPTION OF THE PREFERRED EMBODIMENTS

Figure 1:
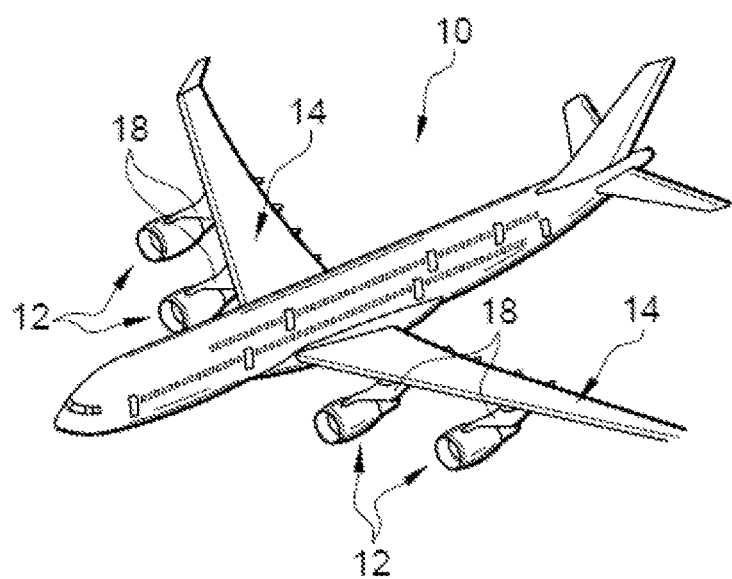
FIG. 1 is a perspective view of an aircraft.
Figure 2:
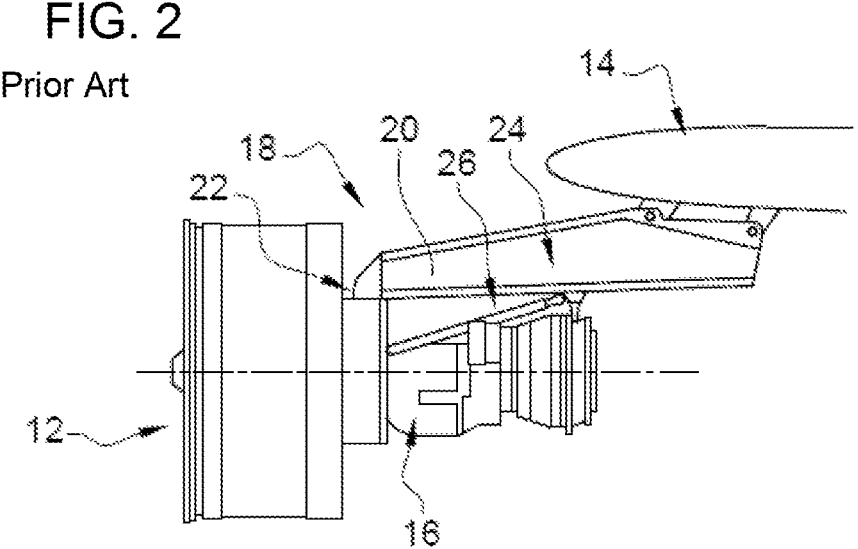
FIG. 2 is a schematic representation of a propulsion unit connected to a wing, which illustrates one prior-art embodiment.
Figure 3:
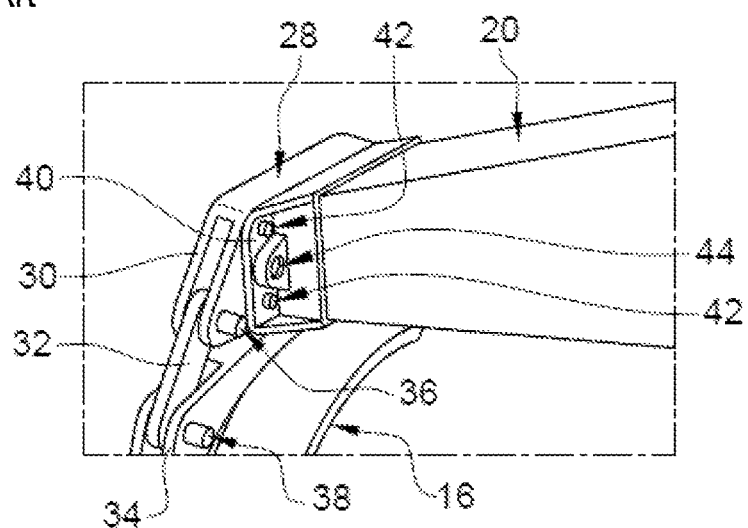
FIG. 3 is a perspective view of a front engine attachment of an aircraft, which illustrates a prior-art embodiment.
Figure 4:
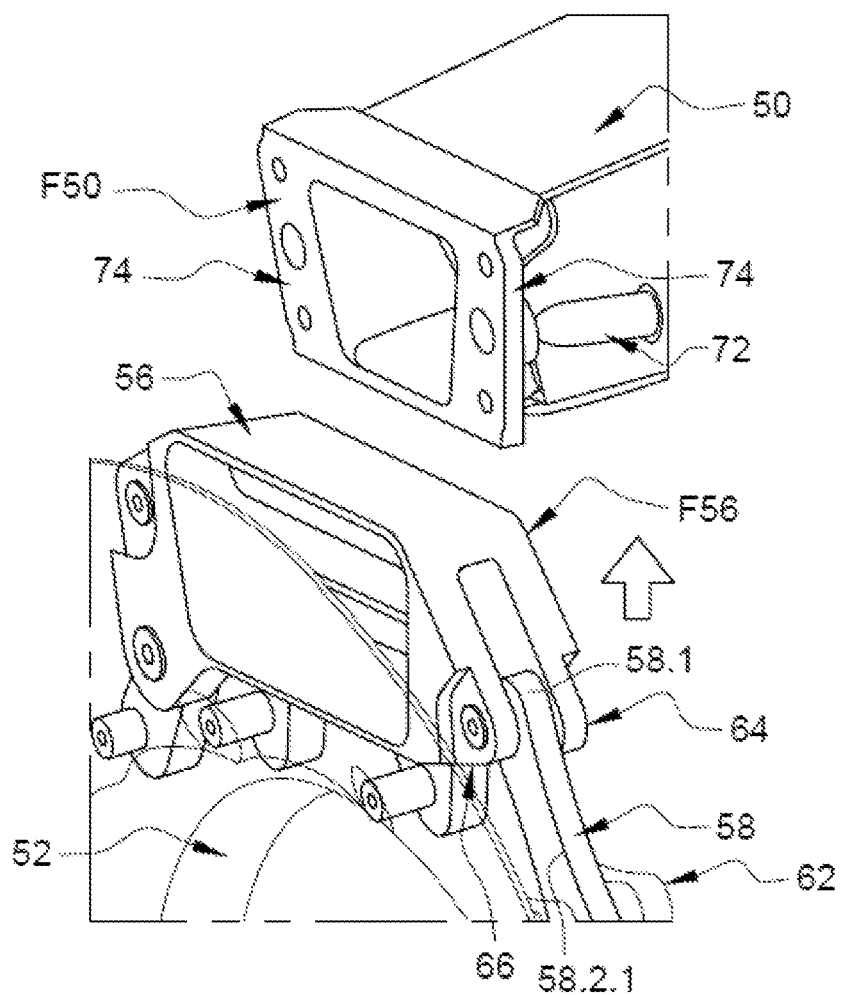
FIG. 4 is a perspective view of a front engine attachment of an aircraft in the dismantled state, which illustrates an embodiment of the invention.
Figure 5:
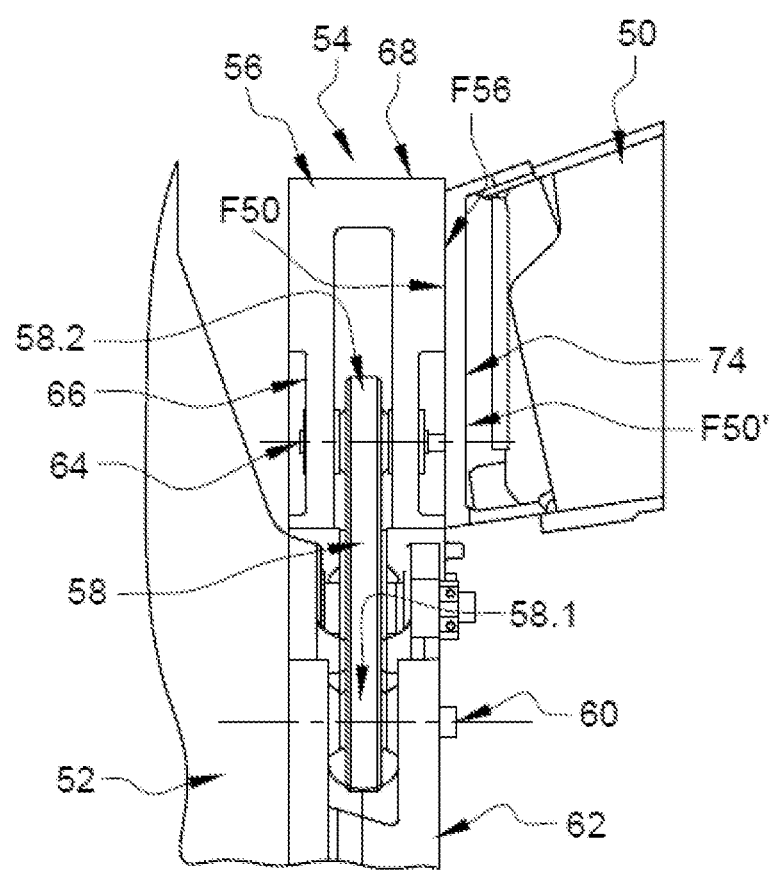
FIG. 5 is a side view of a front engine attachment of an aircraft in the assembled state, which illustrates an embodiment of the invention.

According to one embodiment illustrated in FIGS. 4 and 5, a primary structure 50 of an aircraft pylon is connected to an aircraft engine 52 via front engine attachment 54.

In the remainder of the description, a longitudinal direction is a direction parallel to the axis of rotation of the aircraft engine 52. A vertical longitudinal plane is a vertical plane passing through the axis of rotation of the aircraft engine 52. The terms "front" and "rear" refer to the direction of flow of the flow of air inside the aircraft engine 52 during operation, the flow of air flowing from front to rear. The terms "horizontal" and "vertical" correspond to the horizontal (perpendicular to the direction of gravitational acceleration) and vertical (parallel to the direction of gravitational acceleration) directions when the aircraft is on the ground.

Although described in terms of application to a front engine attachment, the invention is in no way limited to that application and could be used for the other engine attachments.

According to one configuration, the front engine attachment 54 comprises an attachment body 56, two connecting rods 58 arranged on either side of the vertical longitudinal plane, each connecting the attachment body 56 to the aircraft engine 52, and also, for each connecting rod 58, a first articulation pin 60 connecting a first end 58.1 of the connecting rod 58 to a first clevis 62 of the aircraft engine 52 and at least a second articulation pin 64 connecting a second end 58.2 of the connecting rod 58 to a first clevis 66 of the attachment body 56.

The primary structure 50 comprises at least a first contact face F50 against which is placed at least a second contact face F56 of the attachment body 56. The first and second contact faces F50 and F56 are arranged in vertical planes approximately perpendicular to the longitudinal direction.

The front engine attachment 54 comprises an attachment body link 68 connecting the attachment body 56 and a part of the primary structure 50, making it possible to hold the first and second contact faces F50 and F56 pressed against one another. This link 68 of the attachment body comprises a plurality of link elements 70, such as bolts, for example, and at least one shear pin 72. The part of the primary structure 50 may be a component attached to the primary structure 50.

According to a configuration visible, for example in FIG. 4, the primary structure 50 comprises two fixing lugs 74 having coplanar faces that form the first contact face F50 and extend in a substantially vertical plane perpendicular to the longitudinal direction, on either side of the primary structure 50. For each fixing lug 74, the attachment body link 68 comprises two link elements 70, 70' and a shear pin 72, the link elements 70, 70' being arranged above and below the shear pin 72.

Figure 6:
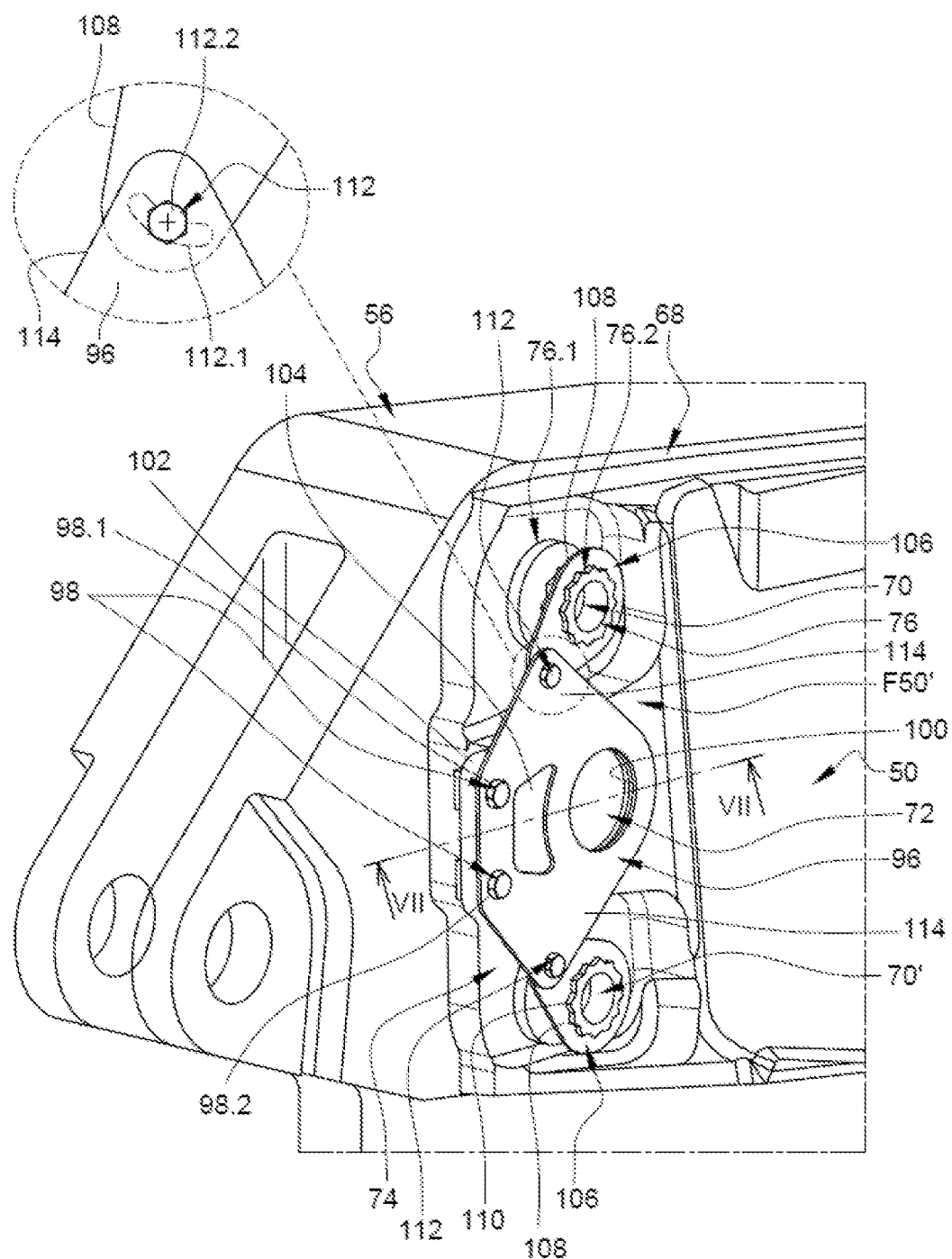
FIG. 6 is a perspective view of a front engine attachment of an aircraft in the assembled state, which illustrates an embodiment of the invention.

According to an embodiment visible in FIG. 6, each link element 70, 70' is a bolt that comprises a head 76 having a circular lower cross section 76.1 and a polygonal upper cross section 76.2.

The attachment body 56, the connecting rods 58, the first and second articulation pins 60, 64 and the link elements 70, 70' are not described further as they may be identical to those in the prior art.

Each shear pin 72, comprises a cylindrical body 78 that has a first "free" end 78.1, which is preferably rounded, and a second end 78.2 (opposite the first end), and also a flange 80 positioned at the second end 78.2 of the cylindrical body 78. The flange 80 has two planar faces perpendicular to the axis of the cylindrical body 78 and a diameter D80 greater than the diameter of the cylindrical body 78.

For each shear pin 72, the primary structure 50 comprises a first through-hole 82, having a first end opening out at the first contact face F50 and a second end opening out at an access face F50'. The attachment body 56 comprises a second through-hole 84, the first and second holes 82 and 84 being configured such as to accommodate the cylindrical body 78 of the shear pin 72.

According to a first configuration, the first and second holes 82, 84 have a diameter that is substantially identical (to within the assembly clearance) to the diameter D78 of the cylindrical body 78 of the shear pin 72.

Figure 7:
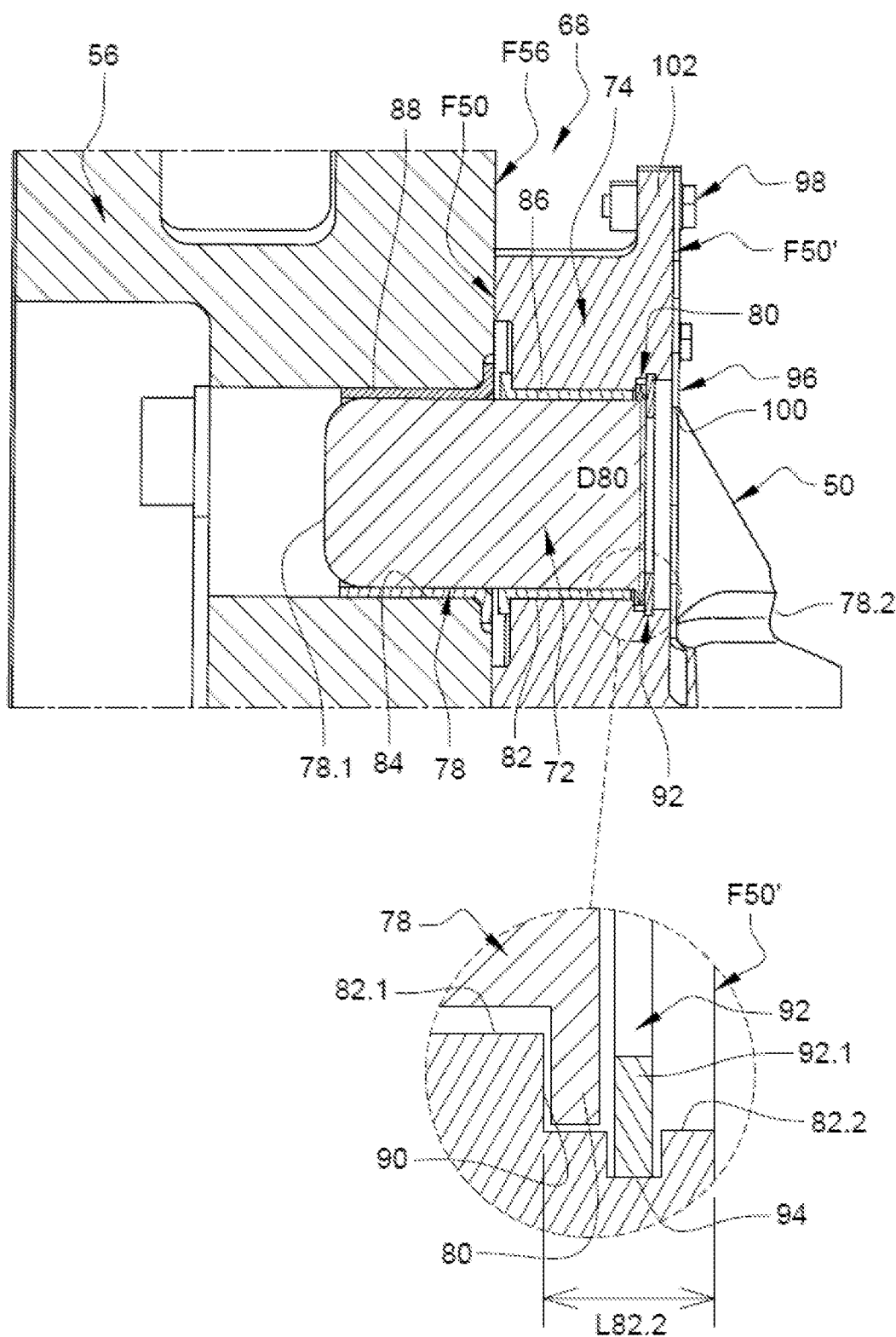
FIG. 7 is a cross section on line VII-VII of FIG. 6 of a part of the front engine attachment that can be seen in FIG. 6.

According to an embodiment visible in FIG. 7, a first sliding ring 86 is interposed between the first hole 82 and the cylindrical body 78 and/or a second sliding ring 88 is interposed between the second hole 84 and the cylindrical body 78.

The attachment body link 68 comprises a system for translational immobilization of the cylindrical body 78 of the shear pin 72 straddling the first and second holes 82, 84.

"Straddling" is understood to mean that a first portion of the shear pin 72 is positioned in the first hole 82 and a second portion of the shear pin 72 is positioned in the second hole 84.

The translational immobilization system comprises a shoulder 90 close to the second end of the first hole 82, which forms a bearing surface against which bears one of the faces of the flange 80 during operation. This shoulder 90 is substantially perpendicular to the axis of the first hole 82. According to one configuration, the first hole 82 comprises a principal portion 82.1 that extends from the contact face F50 as far as the shoulder 90 and an enlarged portion 82.2 that extends from the shoulder 90 as far as the axis face F50'. The enlarged portion 82.2 has a diameter greater than that of the principal portion 82.1 and the diameter D80 of the flange 80 such that the latter is accommodated in the enlarged portion 82.2 and bears against the shoulder 90 during operation.

The translational immobilization system also comprises a removable stop 92, integral with the first structure 50, configured such as to immobilize the flange 80 between the shoulder 90 and the removable stop 92. The removable stop 92 is separated from the shoulder 90 by a distance substantially equal to the thickness of the flange 80 (dimension taken parallel to the axis of the cylindrical body 78 of the shear pin 72). During operation, the flange 80 is immobilized between the shoulder 90 and the removable stop 92. Thus, the shear pin 72 is immobilized in translation in the first and second holes 82, 84. The shoulder 90 and the removable stop 92 form a first translational immobilization system.

According to an embodiment, the enlarged portion 82.2 comprises a groove 94 that extends between two planes perpendicular to the axis of the first hole 82 and over the entire circumference of the first hole 82. This groove 94 is separated from the shoulder 90 by a distance substantially equal to the thickness of the flange 80. By way of complement, the removable stop 92 is a circlip 92.1 accommodated in the groove 94.

The attachment body link 68 comprises a second system for translational immobilization of the shear pin 72. This second translational immobilization system comprises a stop plate 96, lying against the access face F50', connected by at least one removable link 98 to the primary structure 50, which closes the first hole 82 at least in part.

In order to reduce its mass, the stop plate 96 comprises an orifice 100 in line with the first hole 82 that has a diameter smaller than the diameter D80 of the flange 80. During operation, when the stop plate 96 is fixed to the primary structure the orifice 100 is coaxial with the first hole 82.

According to an embodiment, the removable link 98 comprises two fixing elements 98.1, 98.2 that each have a screw. For each fixing element 98.1, 98.2, the stop plate 96 has a passage orifice of which the diameter is slightly greater than that of the rod of the fixing element 98.1, 98.2. By way of complement, for each stop plate 96 the primary structure 50 comprises an extension 102 traversed by each removable link 98. Thus, the extension 102 has a passage hole for each fixing element 98.1, 98.2. Each fixing element 98.1, 98.2 is a bolt and comprises a nut in addition to the screw. This configuration makes it possible to connect the stop plate 96 to the primary structure 50 without the need to drill a hole in the primary structure 50.

According to an embodiment visible in FIG. 6, the stop plate 96 comprises, in addition to the orifice 100, at least one recess 104 in order to reduce its mass.

The attachment body link 68 comprises at least one anti-rotation system 106 for at least one of the link elements 70, 70'. According to one configuration, the attachment body link 68 comprises an anti-rotation system 106 for each link element 70, 70'. According to an embodiment, an anti-rotation system 106 comprises an anti-rotation plate 108 that has a through-orifice 110 that has a cross section that complements the upper cross section 76.2 of the head 76 of the link element 70, 70', and also a removable link 112 for connecting same directly or indirectly to the primary structure 50. By way of complement, it is understood that when the upper cross section 76.2 of the head 76 is inserted into the through-orifice 110 the anti-rotation plate 108 and the head 76 are immobilized in rotation relative to one another.

The removable link 112 comprises a first passage hole 112.1 of oblong form at the anti-rotation plate 108 and a fixing element 112.2, such as a bolt, for example. The oblong form of the passage hole 112.1 has the same center as the through-orifice 110 and makes it possible to accommodate the fixing element 112.2 by tolerating a slight angular offset of the anti-rotation plate 108.

According to an embodiment visible in FIG. 6, each anti-rotation plate 108 is connected to the stop plate 96 that is itself connected to the primary structure 50. To that end, for each anti-rotation plate 108 the stop plate 96 comprises an extension 114 that has a passage orifice for the corresponding fixing element 112.2.

The method for mounting the engine attachment 54 is as follows:

In a first stage, the attachment body 56 is connected to the aircraft engine 52 by the connecting rods 58.

Next, the aircraft engine 52 is moved vertically such as to position the first and second contact faces F50 and F56 facing one another. The passage holes of the link elements 70, 70' are aligned, for example by inserting centering pins in the first and second holes 82, 84 designed for the shear pins.

The link elements 70, 70' are placed. Next, the centering pins are removed and the shear pins 72 are inserted into the first and second holes 82, 84 until, for each of them, the flange 80 bears against the shoulder 90. For each shear pin 72, the circlip 92.1 is placed in the groove 94 of the enlarged portion 82.2 of the first hole 82.

For each link element 70, 70' the anti-rotation plate 108 is placed in position. Next, for each shear pin 72 the stop plate 96 is positioned and then the fixing elements 98.1, 98.2 are placed in position to connect the stop plate 96 to the primary structure 50. Lastly, each anti-rotation plate 108 is connected to the stop plate 96 by the fixing elements 112.2.

In terms of dismantling, the above steps are reproduced in the reverse order.

According to this assembly method, each shear pin 72 and its immobilization systems are placed from only the access face F50'. Thus, the space between the attachment body 56 and the aircraft engine 52 may be very small at the front of the attachment body 56.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft engine attachment comprising:
   an attachment body connected to a primary structure of an aircraft pylon via an attachment body link comprising link elements and at least one shear pin that comprises a cylindrical body and a flange having a diameter greater than that of the cylindrical body,
     the attachment body link comprising, for each shear pin, a first hole in the primary structure and a second hole in the attachment body that are configured such as to accommodate the shear pin, the first hole comprising a shoulder against which the flange bears during operation in such a manner that the cylindrical body is positioned to straddle the first and second holes,
   a first immobilization system that comprises, in addition to the shoulder, a removable stop, secured to the primary structure, configured such as to immobilize the flange between the shoulder and the removable stop, and
   a second immobilization system that comprises a stop plate, connected by at least one removable link to the primary structure, which closes the first hole, at least in part,
   wherein the attachment body link comprises at least one anti-rotation system for at least one of the link elements, each anti-rotation system comprising an anti-rotation plate that has a through-orifice with a section that complements a section of a head of the link element such that the stop plate and the head are immobilized in rotation relative to one another, and also a removable link for connecting said anti-rotation plate to the primary structure.

2. The aircraft engine attachment according to claim 1, wherein each anti-rotation plate is connected to the stop plate.

3. The aircraft engine attachment according to claim 2, wherein for each anti-rotation plate, the stop plate comprises an extension that has a passage orifice for a fixing element connecting the anti-rotation plate and the stop plate.

4. The aircraft engine attachment according to claim 1, wherein the stop plate comprises an orifice that has a diameter smaller than a diameter of the flange, positioned in line with the first hole when the stop plate is connected to the primary structure.

5. The aircraft engine attachment according to claim 4, wherein for each stop plate, the primary structure comprises an extension traversed by each removable link.

6. The aircraft engine attachment according to claim 5, wherein the removable link comprises two fixing elements, each being accommodated in passage holes of the stop plate and of the extension.

7. The aircraft engine attachment according to claim 6, wherein the stop plate comprises a recess in addition to the orifice.

8. An aircraft comprising an engine attachment according to claim 1.

9. A method for mounting an engine attachment comprising:
   an attachment body connected to a primary structure of an aircraft pylon via an attachment body link comprising link elements and at least one shear pin that comprises a cylindrical body and a flange having a diameter greater than that of the cylindrical body,
     the attachment body link comprising, for each shear pin, a first hole in the primary structure and a second hole in the attachment body that are configured such as to accommodate the shear pin, the first hole comprising a shoulder against which the flange bears during operation in such a manner that the cylindrical body is positioned to straddle the first and second holes,
   a first immobilization system that comprises, in addition to the shoulder, a removable stop, secured to the primary structure, configured such as to immobilize the flange between the shoulder and the removable stop, and
   a second immobilization system that comprises a stop plate, connected by at least one removable link to the primary structure, which closes the first hole, at least in part,
   wherein the attachment body link comprises at least one anti-rotation system for at least one of the link elements, each anti-rotation system comprising an anti-rotation plate that has a through-orifice with a section that complements a section of a head of the link element such that the stop plate and the head are immobilized in rotation relative to one another, and also a removable link for connecting said anti-rotation plate to the primary structure, the method comprising the steps:
   connecting the attachment body to an aircraft engine,
   vertically moving the aircraft engine such as to position first and second contact faces of the primary structure of the aircraft pylon and of the attachment body opposite one another,
   placing the link elements,
   inserting each shear pin into the first and second holes until the flange is in contact with the shoulder,
   placing the removable stop, and
   positioning a stop plate and connecting the stop plate to the primary structure such as to close the first hole at least in part.

\* \* \* \* \*